(12) United States Patent
Paul et al.

(10) Patent No.: US 8,411,139 B2
(45) Date of Patent: Apr. 2, 2013

(54) MICROSCOPE SYSTEM AND METHOD FOR OPERATING A MICROSCOPE SYSTEM

(75) Inventors: Juergen Paul, Wiesloch (DE); Robert Schuermann, Bergdietikon (CH); Urs Gomez, Oberembrach (CH)

(73) Assignee: Leica Microsystems CMS GmbH, Wetzlar (DE)

( * ) Notice: Subject to any disclaimer, the term of this patent is extended or adjusted under 35 U.S.C. 154(b) by 1745 days.

(21) Appl. No.: 10/596,723

(22) PCT Filed: Dec. 14, 2004

(86) PCT No.: PCT/EP2004/053473
§ 371 (c)(1),
(2), (4) Date: Jun. 22, 2006

(87) PCT Pub. No.: WO2005/071460
PCT Pub. Date: Aug. 4, 2005

(65) Prior Publication Data
US 2007/0091324 A1  Apr. 26, 2007

(30) Foreign Application Priority Data
Dec. 22, 2003  (DE) .................. 103 61 150

(51) Int. Cl.
*H04N 7/18* (2006.01)

(52) U.S. Cl. ............. 348/79; 359/368; 359/384; 348/80
(58) Field of Classification Search ................ 359/368, 359/384; 348/79
See application file for complete search history.

(56) References Cited

U.S. PATENT DOCUMENTS

| | | | |
|---|---|---|---|
| 4,414,749 A * | 11/1983 | Johannsmeier | 359/385 |
| 4,647,764 A | 3/1987 | Chadwick | |
| 4,873,653 A | 10/1989 | Grosskopf | |
| 2002/0135678 A1* | 9/2002 | Bacus et al. | 348/143 |
| 2003/0030902 A1 | 2/2003 | Fukushima et al. | |

FOREIGN PATENT DOCUMENTS
DE  198 39 777  3/1999

OTHER PUBLICATIONS
International Search Report for International Application No. PCT/EP2004/053473, mailed on Aug. 4, 2005.

* cited by examiner

*Primary Examiner* — Andy Rao
(74) *Attorney, Agent, or Firm* — Leydig, Voit & Mayer, Ltd.

(57) ABSTRACT

A microscope system includes a microscope, a digital camera and a computer system. The microscope has an automatically adjustable subassembly having an adjustable element. The digital camera acquires image data of an image of a specimen. The computer system has a display and a storage unit configured to store the image data and to store, associated with the image data, data defining a setting of the automatically adjustable subassembly corresponding to the image data.

34 Claims, 7 Drawing Sheets

MICROSCOPE SYSTEM AND METHOD FOR OPERATING A MICROSCOPE SYSTEM

This is a U.S. national phase application under 35 U.S.C. §371 of International Patent Application No. PCT/EP2004/053473, filed Dec. 14, 2004, and claims benefit of German Patent Application No. 103 61 150.9, filed Dec. 22, 2003 which is incorporated by reference herein. The International Application was published in German on Aug. 4, 2005 as WO 2005/071460 A2 under PCT Article 21(2).

The invention relates to a microscope system comprising a microscope having at least one automatically adjustable subassembly that is provided with at least one adjustable element, comprising a digital camera for acquiring image data of an image of a specimen that is to be analyzed, and comprising a computer system having at least one display and at least one storage unit.

Moreover, the invention relates to a method for operating a microscope system, comprising a microscope having at least one automatically adjustable subassembly that is provided with at least one adjustable element, comprising a digital camera, and comprising a computer system having at least one display and at least one storage unit.

BACKGROUND

German Preliminary Published Application DE 198 39 777 discloses an electric microscope. The invention disclosed there makes it easy to apply liquid onto a specimen when an immersion objective is moved into or out of the optical path. The microscope comprises an electric nosepiece that carries several objectives. A nosepiece rotational position sensor detects the rotational position of the nosepiece in order to thus obtain information about which objective is presently located in the optical path. The information as to whether the objectives are immersion objectives or dry objectives is stored in a storage unit. During the change-over from one objective to the next, the movement is stopped in the middle between two rotational positions if the objective currently located in the optical path or the next objective is an immersion objective. This middle position is indicated to the user in the form of a signal or an alarm. The objective data is entered using a data entry unit. The objective data comprises the following: immersion objective, dry objective, magnification, working distance, numerical aperture, parfocal length. This data is stored in accordance with the position of the individual objectives in the nosepiece. The data can be recorded using a barcode reader or a numerical keypad. The device described here is not capable of associating settings of the microscope with recorded images in such a way that a microscope setting belonging to an image can be specified in order to record one or more images with the same settings.

SUMMARY

It is an aspect of the present invention to provide a microscope system with which settings of the microscope can be specified in a simple manner, whereby the settings of the microscope correspond to the settings of an already recorded image or reference image.

In an embodiment, the present invention provides a microscope system including a microscope, a digital camera and a computer system. The microscope has an automatically adjustable subassembly having an adjustable element. The digital camera is configured to acquire image data of an image of a specimen. The computer system has a display and a storage unit configured to store the image data and to store, associated with the image data, data defining a setting of the automatically adjustable subassembly corresponding to the image data.

It is also another, alternative, aspect of the present invention to provide a method with which settings of the microscope can be specified in a simple manner, whereby the settings of the microscope corresponding to the settings of an already recorded image or reference image are used to regulate the setting of the microscope.

In an embodiment, the present invention provides a method for operating a microscope system including a microscope having at least one automatically adjustable subassembly with at least one adjustable element, a digital camera connected to the microscope, and a computer system having at least one display and at least one storage unit. The method includes:

acquiring, by the digital camera, image data of an image of a specimen;

storing the image data in the storage unit;

associating, with the image data stored in the storage unit, data defining a setting of the at least one subassembly of the microscope;

depicting the image on a user interface of the display;

selecting the image depicted on the user interface and the associated data defining the setting of the at least one automatically adjustable subassembly of the microscope; and automatically establishing the setting of the at least one automatically adjustable subassembly using the at least one adjustable element.

BRIEF DESCRIPTION OF THE DRAWINGS

Exemplary embodiments of the present invention are schematically depicted in the drawing and described below with reference to the figures. These show the following.

DETAILED DESCRIPTION

The invention has the advantage that at least the image data of one image is stored in the storage unit and that data that defines a setting of the microscope that corresponds to the setting of the data belonging to the image data in the storage unit is likewise associated with the image data of the at least one image in the storage unit.

In addition to the images already acquired by the digital camera, image data of at least one reference image can be stored in the storage unit. Data that defines a setting of the microscope that corresponds to the setting of the data belonging to the image data of the reference image in the storage unit is likewise associated with the at least one reference image.

The at least one automatically adjustable subassembly comprises an objective nosepiece, or a microscope stage, or a condenser, or a magnification changer, or at least one filter changer, or at least one adjustable diaphragm, or at least one brightness controller of a lighting device, or the setting of the digital camera. Of course, the microscope system can have several subassemblies. By the same token, their combination can be varied at will.

The objective nosepiece holds at least one objective and allows several positions, each of which can hold an objective. The objective nosepiece is associated with at least one motor that rotates the objective nosepiece between the various positions. The microscope stage is provided with a first, a second and a third motor, whereby the first motor moves the microscope stage in the X-direction, the second motor moves the microscope stage in the Y-direction and the third motor moves the microscope stage in the Z-direction. The condenser of the microscope can be changed over with a motor-driven actuation element. The magnification changer can be changed over with a motor-driven actuation element. The filter changer is a filter wheel equipped with a motor that moves the individual filter elements into the optical axis. The adjustable diaphragm can likewise be adjusted by means of a motor. The brightness controller for the lighting device comprises an electronic circuit. The setting of the digital camera is specified via a user interface that is depicted on the display.

The user interface of the digital camera is essentially divided into a first area, a second area and a third area. Settings for the acquisition of an image are specified in the first area. The configuration for the type of digital camera employed can be set in the second area. An image acquired by the digital camera is depicted in the third area.

Another user interface for handling the image data stored in the storage unit of each image and for handling the settings of the microscope belonging to the image data of each image can be depicted on the display. The user interface for handling the image data stored in the storage unit is divided into several separate windows. Together with the thumbnails, data is also depicted on the user interface that serves to set the microscope and/or to designate the image data shown on the thumbnails.

The computer system of the microscope system is associated with an input unit that is a mouse and/or a trackball and/or a keyboard and/or a touchscreen.

Another user interface can be used to output a message that shows the status of the setting of the microscope, whereby the setting is based on the data that is associated with the image data. The subassemblies that go with the type of microscope being used and that are to be adjusted are depicted on the user interface. The subassemblies that are automatically adjusted on the basis of the data associated with the image data are associated with a first message that indicates the change that has been made. The subassemblies that go with the type of microscope being used and that are to be adjusted are depicted on the user interface, while those subassemblies that cannot be automatically adjusted on the basis of the data associated with the image data are associated with a second message that indicates that the change has not been made for this subassembly. Here, the message can be that the adjustment of the subassembly or subassemblies has to be carried out manually by the user. The subassemblies that are not implemented in the microscope are indicated on the display by a third message.

For purposes of being able to reproduce the microscope settings, a specimen slide is placed onto the microscope stage, said specimen slide having a marking that can be detected by the microscope system and that constitutes a reference point for the X-value and the Y-value of the microscope stage. The marking can be provided on a non-transparent part of the specimen slide. The specimen slide can likewise have an element that interacts with a counterpart on a slide holder. This results in a defined placement and orientation of the specimen slide on the microscope stage.

The method for operating a microscope system is likewise advantageous. The microscope system comprises a microscope which has at least one automatically adjustable subassembly that is fitted with at least one adjustable element. The microscope system also comprises a digital camera and a computer system having at least one display and at least one storage unit. The method comprises the following steps:

at least the image data of an image of a specimen that is acquired by the digital camera connected to the microscope is stored in the storage unit;

the image data acquired by the digital camera is stored in the storage unit of the computer system;

data that defines a setting of the at least one subassembly of the microscope is associated with the image data stored in the storage unit;

an image depicted on a user interface of the display and the appertaining data for the setting of the at least one subassembly of the microscope are selected; and the setting of the at least one subassembly is carried out automatically with the at least one adjustable element.

The method is also characterized in that, in addition to the images acquired by the digital camera, image data of at least one reference image is stored in the storage unit, and in that data that is used for a setting of the microscope corresponding to the setting of the data belonging to the image data in the storage unit is likewise associated with the at least one reference image.

Figure 1:
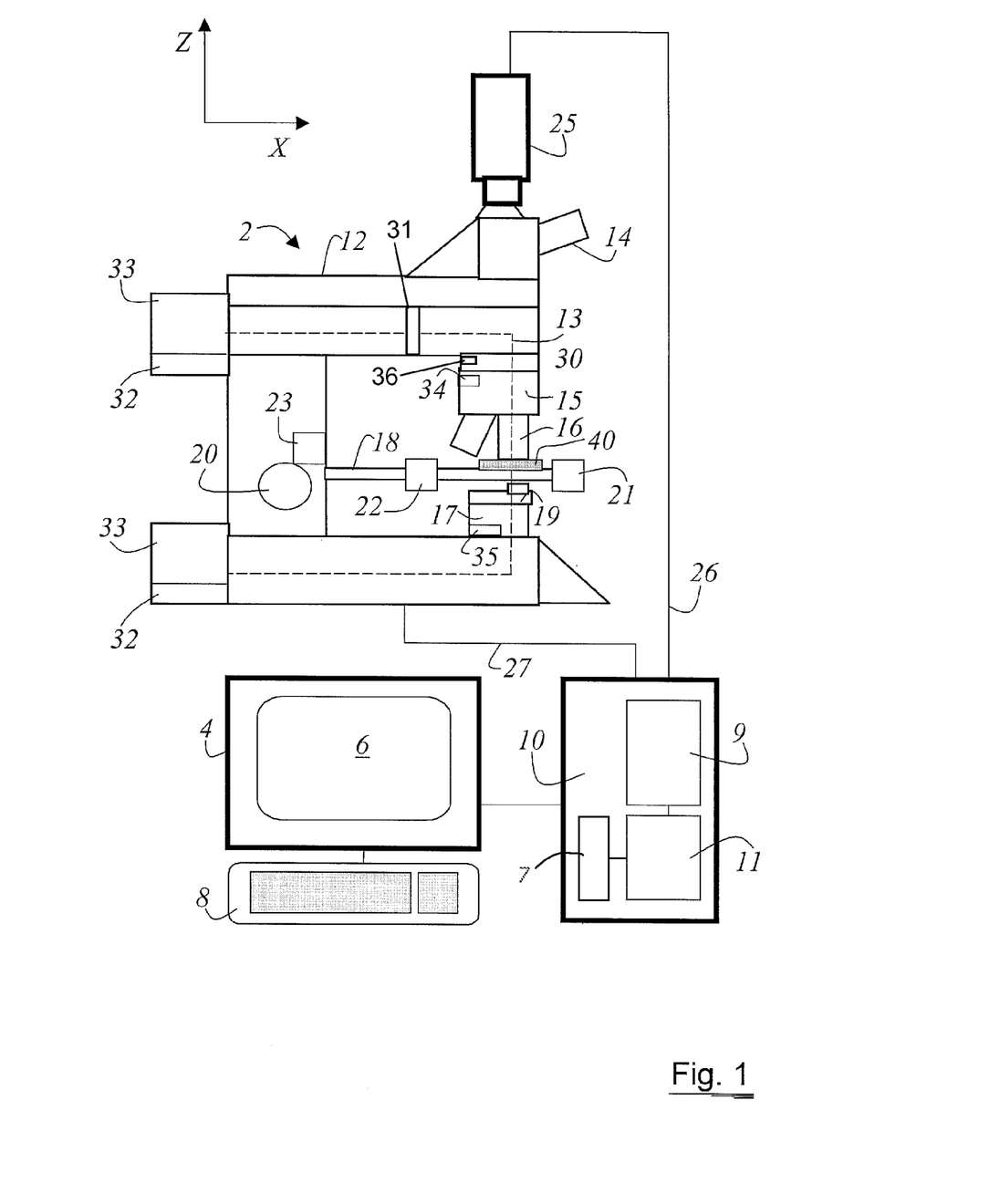
FIG. 1 a schematic view of an embodiment of a microscope in conjunction with a computer system for controlling the microscope and for storing image data.

FIG. 1 schematically shows a microscope system. The microscope system comprises a microscope 2 schematically depicted in a side view. In the embodiment shown here, the microscope 2 is associated with a computer system 4 having at least one display 6 and an input means 8 as well as a regulation and control unit 10 for controlling the various microscope functions. The regulation and control unit 10 also comprises a storage unit 9, a microprocessor 11, and likewise various standardized, electronic cards 7 for controlling the microscope 2. It goes without saying that the microscope 2 can have any conceivable form and configuration and the depiction in FIG. 1 should not be construed in any limiting manner whatsoever. The microscope 2 comprises a stand 12 which holds at least one eyepiece 14, at least one objective 16 and a microscope stage 18 that can be moved in all spatial directions. A specimen 40 that is to be microscopically examined or treated can be placed onto the microscope stage 18. FIG. 1 shows the X-direction X and the Z-direction Z. In this depiction, the Y-direction Y is perpendicular to the plane of the drawing. In the embodiment shown here, the microscope 2 comprises an objective nosepiece 15 onto which the various objectives 16 are attached. The at least one objective 16, which is in the working position, defines an optical axis 13 (shown by a broken line). Moreover, an adjustment knob 20 is provided on both sides of the stand 12, with which the height of the microscope stage 18 can be adjusted (in the Z-direction Z) relative to the objective 16 in the working position. The microscope stage 18 of the microscope 2 can be moved by a first motor 21 in the X-direction X, by a second motor 22 in the Y-direction Y and by a third motor 23 in the Z-direction Z. The first, second and third motors 21, 22 and 23 are actuated by the regulation and control unit 10. A camera 25 is connected to the microscope 2 and it records the image of the specimen 40 observed with the objective 16. The digital camera 25 is connected to the regulation and control unit 10 via a first electric connection 26. By the same token, the regulation and control unit 10 is connected to the microscope 2 via a second electric connection 27 via which signals are supplied from the microscope 2 to the regulation and control unit 10 and signals are supplied from the regulation and control unit 10 to the microscope 2. During a specific mode of operation, the data pertaining to an acquired image of the specimen 40, which has been supplied to the storage unit 9 by the digital camera 25 and processed by the microprocessor 11, is depicted on the display 6. The microscope 2 comprises at least one subassembly that can be set automatically. The fact that the subassembly or the adjustment element can be set automatically requires that they be provided at least with a motor or with an actuation element. The at least one subassembly that can be adjusted automatically can be an objective nosepiece 15, or a microscope stage 18, or a condenser 17, or a magnification changer 19, or at least one filter changer 30, or at least one adjustable diaphragm 31, or at least one brightness controller 32 of a lighting device 33, or the setting of the digital camera 25. The number of different adjustable subassemblies or elements depends on the type of microscope used and/or on the configuration of the microscope. The objective nosepiece 15 has at least one objective 16. The objective nosepiece 15 allows several positions, each of which can hold an objective 16. The objective nosepiece 15 is associated with at least one motor 34 that rotates the objective nosepiece 15 between the various positions. For example, if an image stored in the storage unit 9 has been recorded with a certain objective 16 that is screwed into the objective nosepiece at a certain position, then the objective nosepiece is rotated by the motor 34 to the position corresponding to the data that corresponds to the stored image. As already mentioned, the same procedure is performed with the microscope stage 18 if it has a motor. The condenser 17, as a subassembly, can likewise be changed over with a motor-driven actuation element 35. The magnification changer is likewise associated with a motor-driven actuation element. The subassembly of the filter changer 30, which is configured as a filter wheel, is fitted with a motor 36 that moves the individual filter elements of the filter wheel into the optical axis 13. The at least one diaphragm 31 can also be configured to be moved by means of a motor. The brightness controller 32 for the lighting device 33 comprises an electronic circuit by means of which the light intensity and/or wavelength emitted by the lighting device can be adjusted.

Figure 2:
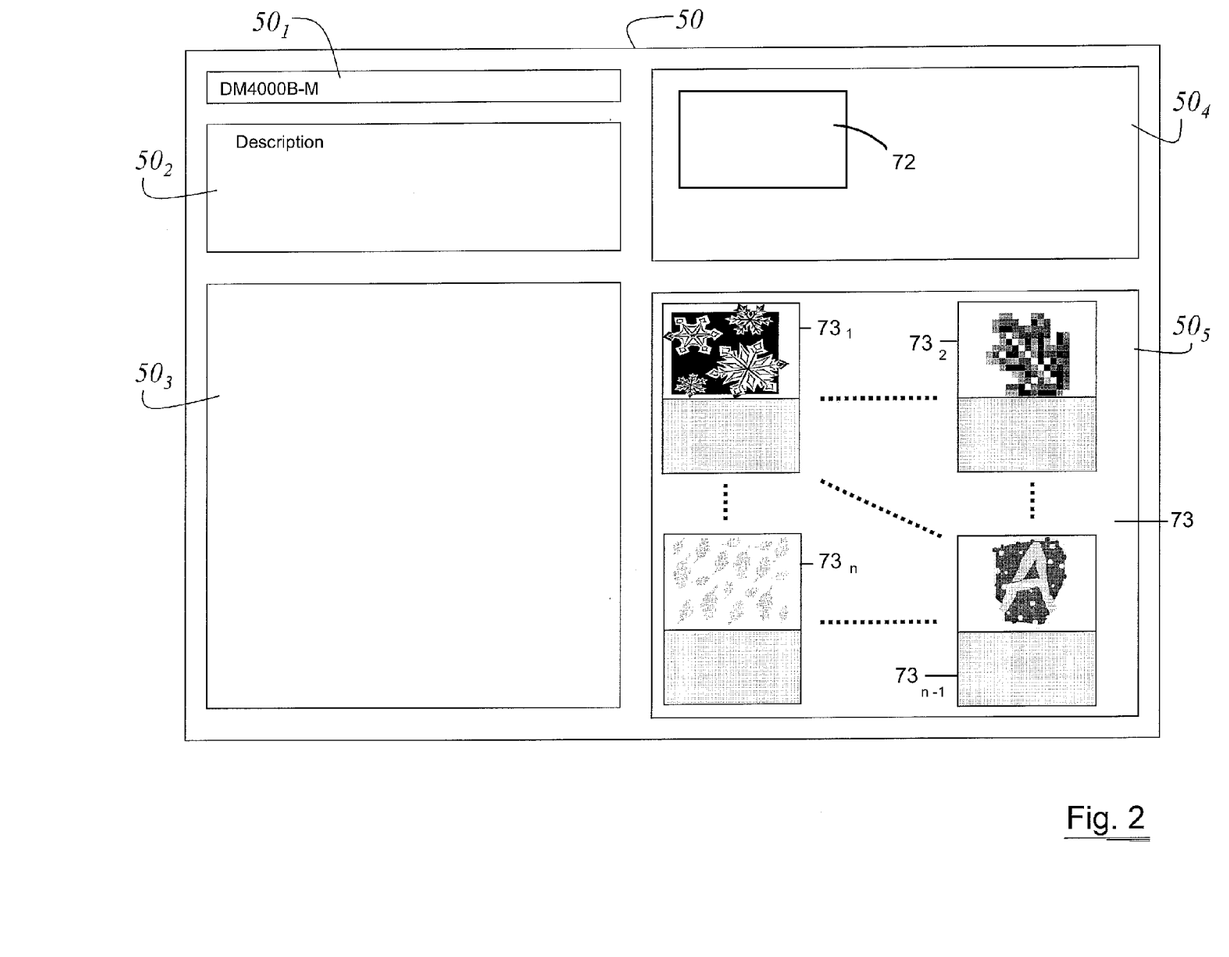
FIG. 2 a view of a user interface depicted on the display and used for archiving and retrieving the microscope data or microscope parameters associated with the archived images.

FIG. 2 is a depiction of a user interface 50 shown on the display 6 for archiving and retrieving the microscope data or microscope parameters associated with the archived images. The user interface 50 for handling the image data stored in the storage unit 9 is divided essentially into a first window $50_1$, a second window $50_2$, a third window $50_3$, a fourth window $50_4$ and a fifth window $50_5$. The microscope type can be entered and displayed in the first window $50_1$ of the user interface 50 for handling the image data stored in the storage unit. Numerous parameters and possible settings are associated with the microscope type entered here. Thus, the entered microscope type already contains information about the settings that can be specified automatically or with a motor for that particular type of microscope. The microscope type is designated by a sequence of letters and/or numbers. In the embodiment shown here, it is a microscope with the designation "DM4000B-M". A freely definable description can be entered and displayed in the second window $50_2$ of the user interface 50 for handling the image data stored in the storage unit. The description can relate, for example, to the test series carried out with the specimen. The settings of the microscope 2 stored in the storage unit 9 for a selected image can be displayed and changed in a third window $50_3$ of the user interface 50 for handling the image data stored in the storage unit 9. Among other things, a name 54 assigned to the stored image data of the image and a file name 55, the magnification 56 of the objective used to acquire the image, the use of a magnification changer 57, the size 58 of the diaphragm opening, the brightness 59, the type of condenser 60, the illuminated field diaphragm 61, the filter cube 62 employed, the objective designation 63, the tube magnification 64, the X-position 65 of the microscope stage, the Y-position 66 of the microscope stage, the Z-position 67 of the microscope stage, the contrasting method 68 employed, the phototube 69 employed, the article number 70 of the phototube employed as well as the position 71 of the nosepiece can all be displayed in the third window $50_3$ (see detailed depiction in FIG. 3). A list 72 of the names assigned to the individual images made up of the acquired image data is displayed in a fourth window $50_4$. The images stored in the storage unit 9 and corresponding to the acquired image data or to the reference images are displayed in a matrix 73 as thumbnails $73_1, 73_2, \ldots, 73_{n-1}$, and $73_n$ in a fifth window $50_5$.

Figure 3:
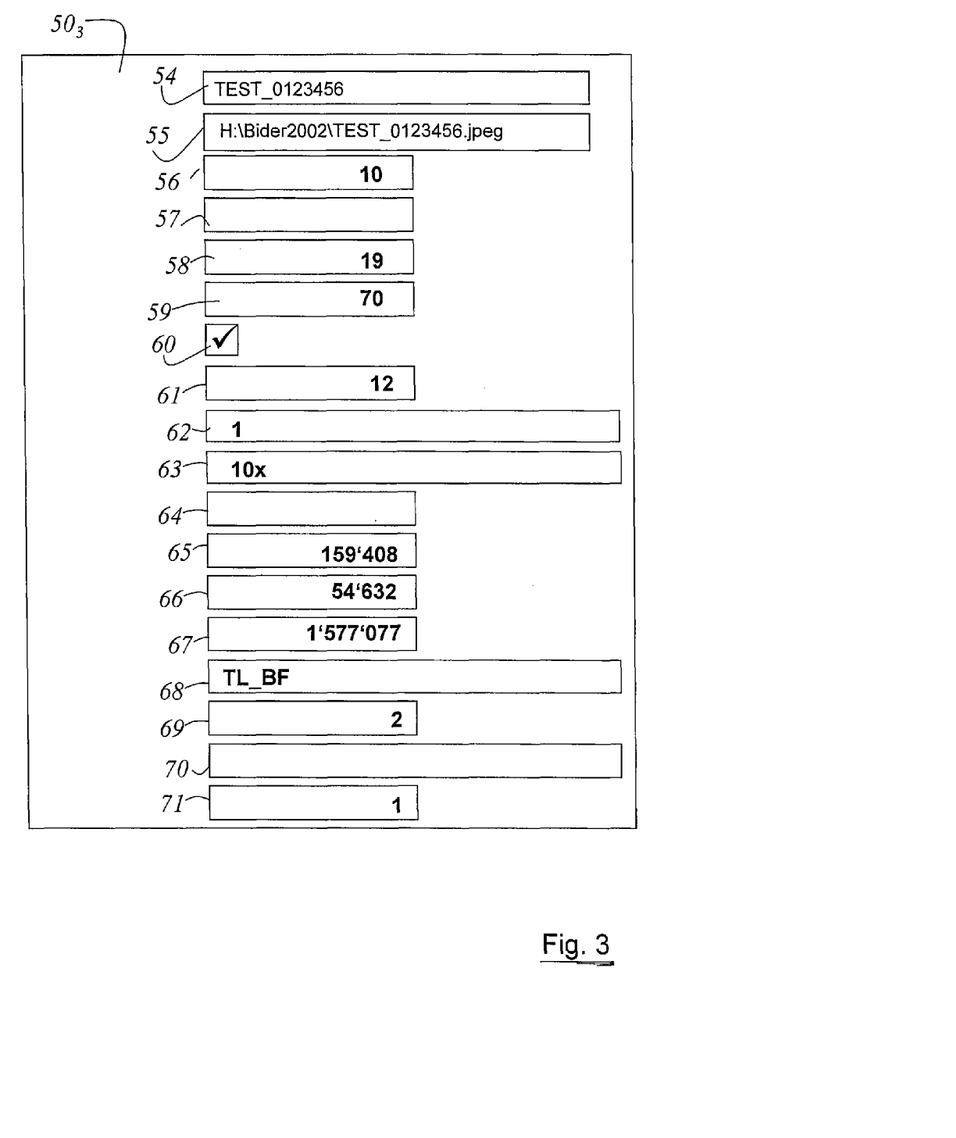
FIG. 3 a depiction of an embodiment of the third window of the user interface of FIG. 2.

FIG. 3 shows a depiction of an embodiment of the third window of the user interface from FIG. 2. An assigned name 54, which is designated, for example, as "TEST_0123456", is depicted on the display 6 for the user. The name can be specified by the user himself. By the same token, it is possible for the microscope system to perform an automatic and consecutive issuing of the names. Moreover, a file name 55 and/or a path are assigned in the storage unit 9 to the stored image data of the image. The reproduction depends on the general requirements for the issuing of file names such as, for example, "H:\Bider2002\TEST_0123456.jpeg". The magnification rating 56 of the objective used for acquiring the image is indicated as a numerical value. The "10" shown here means that the objective 16 having a 10-fold magnification has been swiveled into the optical path of the microscope 2. The use of a magnification changer 57 is likewise indicated. In the present case, no information has been provided, which means that no magnification changer was used to record the selected image. Moreover, the absence of information can also mean that no magnification changer was implemented for the type of microscope used to record the image. The size 58 of the diaphragm opening is likewise indicated as a numerical value. The "19" shown here means that the diaphragm opening has a relative size 19 with which the selected image was recorded. The brightness 59 of the illumination in the microscope 2 is indicated by a numerical value "70". This was the setting of the brightness of the illumination used to record the selected image. The type of condenser 60 can be selected by clicking on a selection box. The illuminated field diaphragm 61 is set at a value "12". The filter cube 62 employed or currently positioned in the optical path of the microscope is indicated with the position "1". The objective designation 63 is indicated as "10×", which refers to the magnification rating of the microscope objective. The magnification is likewise 10-fold. The tube magnification 64 is not indicated here. This means that there is no tube magnification in the optical path of the microscope 2 or that no tube magnification has been implemented. The X-position 65 of the microscope stage is indicated by the numerical value "159'408". The Y-position 66 of the microscope stage is indicated by a numerical value "54'632". The Z-position 67 of the microscope stage is indicated by a numerical value "1'577'077". The employed contrasting method 68 is indicated by a letter code. The information shown here, "TL_BF", means "transmissive light—bright field". The phototube 69 employed is designated by the number "2". This designation refers to a specific type of phototube and to an associated set of parameters. The article number 70 of the phototube employed can likewise be indicated. If no entry is made here, then the article number is not known. The position 71 of the nosepiece 15 is likewise indicated. Here, the nosepiece is, for example, in the position "1".

Figure 4:
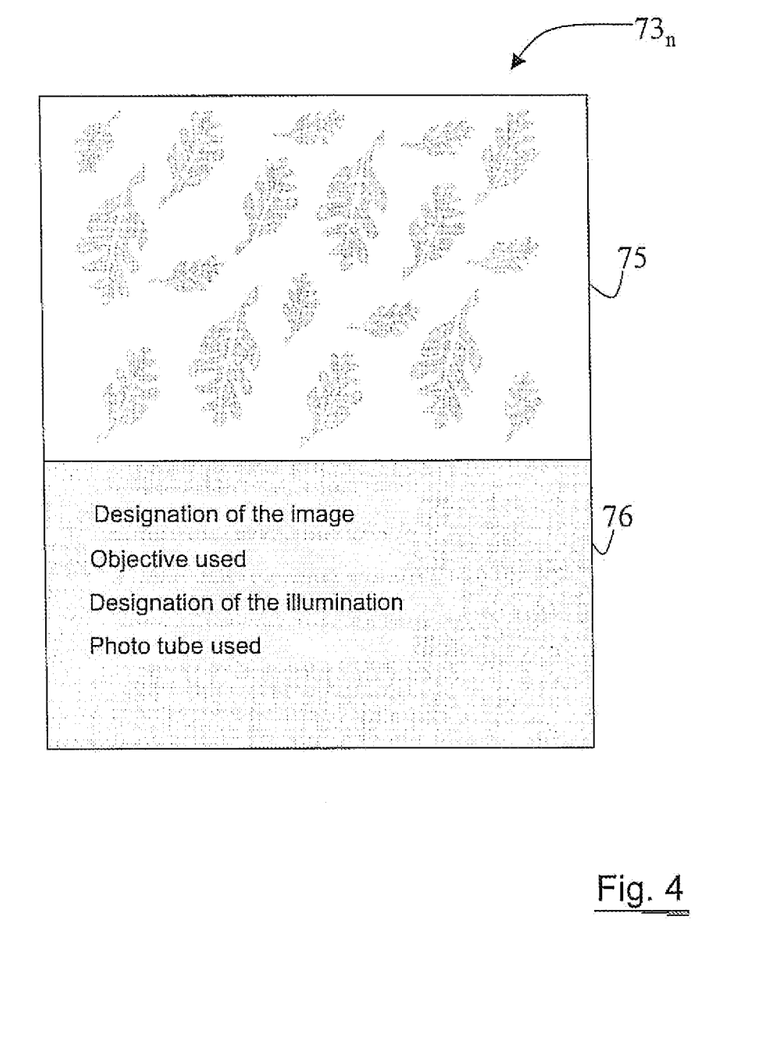
FIG. 4 an embodiment of the depiction of a thumbnail as shown in the fifth window of the display.

FIG. 4 shows an embodiment of the depiction of the thumbnails $73_1, 73_2, \ldots, 73_{n-1}$, and $73_n$ in the fifth window $50_5$ of the display. Together with the thumbnail $73_1$, data is likewise depicted that serves for setting the microscope and/or for designating the image data depicted on the thumbnail $73_1$. The depiction and the selection of the data belonging to the image data of the acquired image can be freely selected by the user. It goes without saying that it is also possible for no data to be displayed together with the thumbnail. The data is associated in the background with the depicted image, it is then retrieved when a certain image is selected and it is depicted on the display in the manner described in FIG. 3. FIG. 4 shows an embodiment of the depiction of a thumbnail $73_n$, as it is shown in the fifth window $50_5$ of the display 9. The thumbnail $73_n$ is divided into a first area 75 and into a second area 76. A graphic reproduction of the acquired image is depicted in the first area 75. Of course, a partial reproduction of the acquired image is also sufficient for the thumbnail $73_n$. At least some of the microscope system settings and/or parameters used for acquiring the image are indicated in the second area 76.

Figure 5:
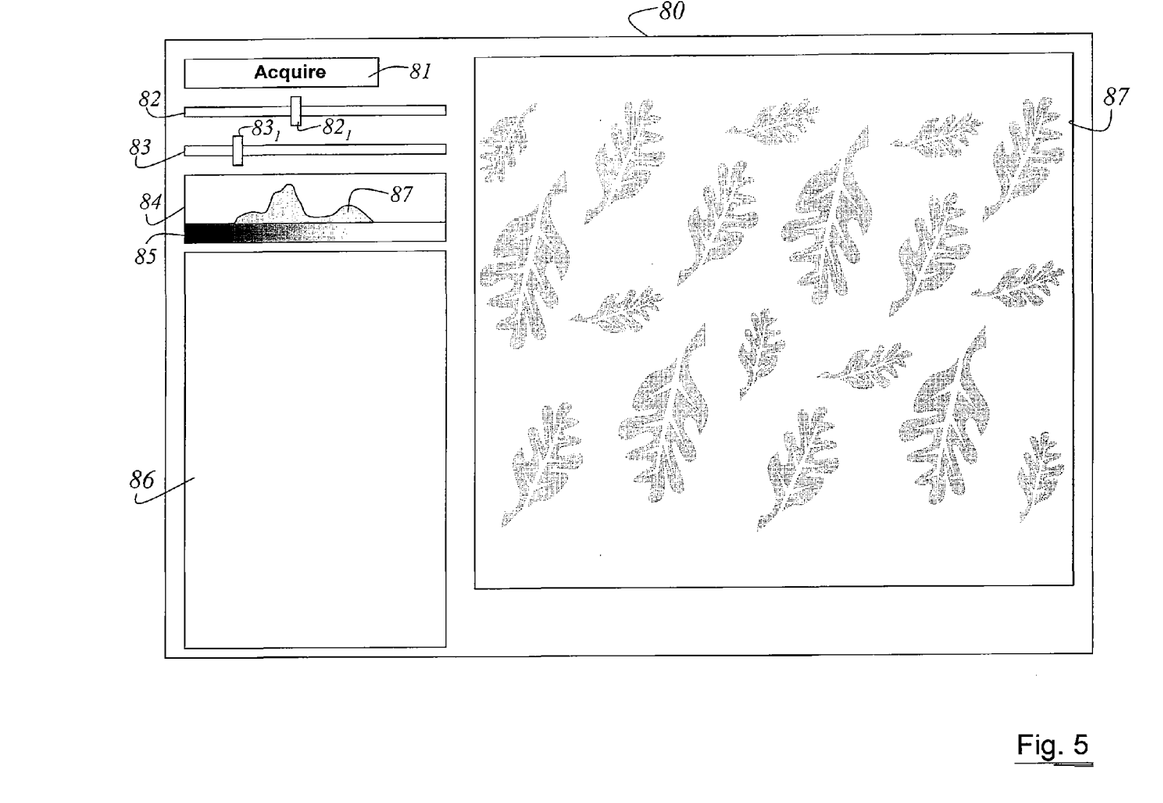
FIG. 5 an embodiment of a user interface for setting the camera used in the microscope system.

FIG. 5 shows an embodiment of a user interface 80 for setting or entering parameters for the digital camera 25 used in the microscope system. The user interface 80 has a button 81 that is designated as "Acquire". When the user actuates the button 81, then the image is acquired by the digital camera. Moreover, a first setting element 82 and a second setting element 83 are shown on the user interface 80. The first and the second setting elements 82 and 83 each have a slide $82_1$ and $83_1$. The first setting element 82 can be used to set the exposure time. The second setting element 83 can be used to set the amplification. The user interface 80 comprises a window 84 in which the brightness distribution of the acquired image is depicted as a histogram 87 of gray-scale values. Below the window 84, a brightness distribution 85 is depicted which, in conjunction with the histogram 87, provides the user with a visual impression of the distribution of the brightness of the image. Another window 86 shows several variable or fixed parameters that inform the user about the settings of the digital camera. For the sake of clarity, the individual parameters are not shown in the figure but rather are explained in the description below. The window 86 shows the type of digital camera currently connected to the microscope system. Subsequently, the parameters of the acquired image are then shown. These are: the resolution of the acquired image such as, for example, "full frame", "half frame", etc.; the white balance, whether it is set; the image balance; the color depth such as, for example, 16 bit/channel or 8 bit/channel; the image type such as, for example, black-and-white, gray-scale image, color image; the employed scaling factor; the enhancement of the sharpness and whether the acquired image was cropped to a ROI (region of interest). By the same token, the parameters or the settings for the recording of a live image are displayed in this window 86. In particular, these are: the resolution and the speed of the image acquisition; the selected mode; the setting of overexposure or underexposure; the automatic setting of the focal position; the matching of the color and whether an image balance has been performed. Moreover, additional settings can be specified in this window 86 such as, for example, whether the image should always be recorded as a live image, whether the image should be reflected horizontally, whether the image should be reflected vertically, whether the hue circle should always be visible and whether the window 86 should close after the image has been recorded. The acquired image is shown to the user in a window 87. The user can immediately see what effect the settings or parameters have on the recorded image. By the same token, it can be indicated on the user interface how many images per second can be acquired.

Figure 6:
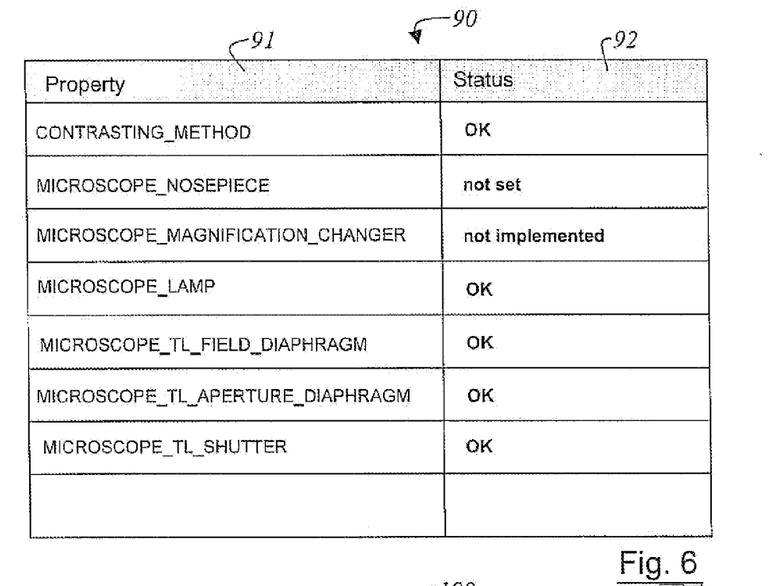
FIG. 6 a user interface showing which setting elements were set in the microscope by the retrieval of a reference image or of an already acquired image.

FIG. 6 is a user interface 90 that shows which setting elements or subassemblies were set in the microscope 2 by retrieving a reference image or an already acquired image. The user interface 90 shows those subassemblies or setting elements that can be set or changed in the type of microscope currently being used. The image data of the acquired images or of the reference image is stored in the storage unit 9. One set of data is associated with the image data of each of these images in the storage unit 9 and this set of data is correspondingly employed for setting the microscope 2. The user interface 90 is divided up into a first part 91 and a second part 92. The property of the subassembly to be set is depicted in the first part 91 and the status of the subassembly to be set is depicted in the second part 92. In the present embodiment, the "Contrasting_Method", the "Microscope_Nosepiece", the "Microscope_Magnification_Changer", the "Microscope_Lamp", the "Microscope_TL_Field_Diaphragm", the "Microscope_TL_Aperture_Diaphragm" and the "Microscope_TL_Shutter" are all depicted in the first part. The status of the subassemblies is depicted in the second part. The "Contrasting_Method" is marked with "OK". This means that the contrasting method of the reference image or of the previously acquired image was set successfully. The "Microscope_Nosepiece" is marked with "not set". This means that the objective nosepiece 15 is not motor-driven and thus cannot be set on the basis of the data of the reference image or of the already acquired image. The "Microscope_Magnification_Changer" is marked with "not implemented". This means that no magnification changer is installed in or configured for this type of microscope. The "Microscope_Lamp" is set at "OK". This means that the illumination values of the reference image or of the previously acquired image were successfully set. The "Microscope_TL_Field_Diaphragm" is set at "OK". This means that the values of the field diaphragm of the reference image or of the previously acquired image were successfully set. The "Microscope_TL_Aperture_Diaphragm" is set at "OK". This means that the values of the aperture diaphragm of the reference image or of the previously acquired image were successfully set. The "Microscope_TL_Shutter" is set at "OK". This means that the shutter has been set to the values that were successfully set for recording the reference image or the previously acquired image.

Figure 7:
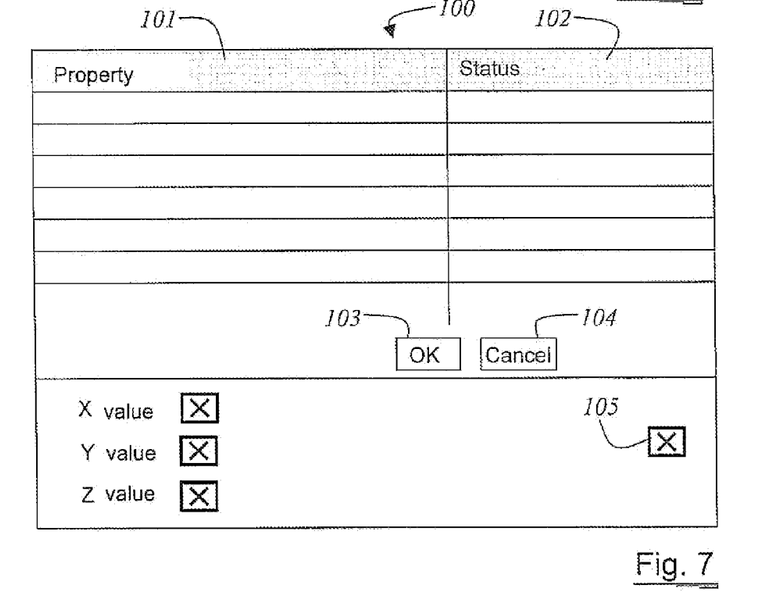
FIG. 7 another embodiment of the user interface showing which setting elements were set in the microscope by the retrieval of a reference image or of an already acquired image.

FIG. 7 shows another embodiment of the user interface 100 that shows which setting elements were set in the microscope 2 by retrieving a reference image or an already acquired image. A number of different adjustable subassemblies or setting elements are indicated in a first part 101 of the user interface. Likewise, as already described for FIG. 6, the status of the subassemblies or setting elements that has been attained on the basis of the data with the current type of microscope is depicted in a second part 102. The user can accept the entries with an OK button 103 or can reject them with a CANCEL button 104. A third part of the user interface 100 displays the X-value, the Y-value and the Z-value that define the position of the microscope stage in which the already acquired image was recorded. An activation button 105 is also provided on the user interface. When this button is activated, a mark & find function is retrieved with which the desired specimen position that corresponds to that of the already acquired image can be established.

Figure 8A:
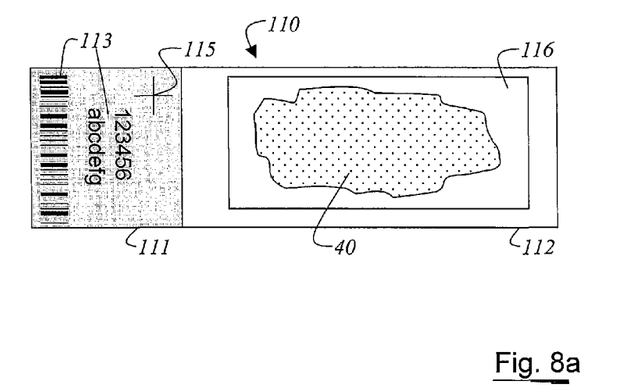
FIG. 8a a specimen slide that makes it easier to reproduce the specimen positions of the already acquired image.

FIG. 8a shows a specimen slide 110 that makes it easier to reproduce the specimen positions of the already acquired image. The specimen slide 110 consists of a non-transparent first area 111 and of a transparent second area 112. The non-transparent first area 111 is provided with an identification 113 in the form of a barcode and/or of readable information. The transparent area carries the specimen 40 that is to be observed with the microscope system. The specimen 40 can also be additionally covered with a cover glass 116. The specimen slide also comprises a marking 115 in the form of cross hairs that serve as a reference point for the specimen position. The specimen stage is to be moved away from the marking corresponding to the X-value and the Y-value, so that the specimen position is in the optical axis. The marking 115 can be made on the transparent or on the non-transparent part. However, it is advantageous for the marking 115 to be made on the non-transparent part 111.

Figure 8B:
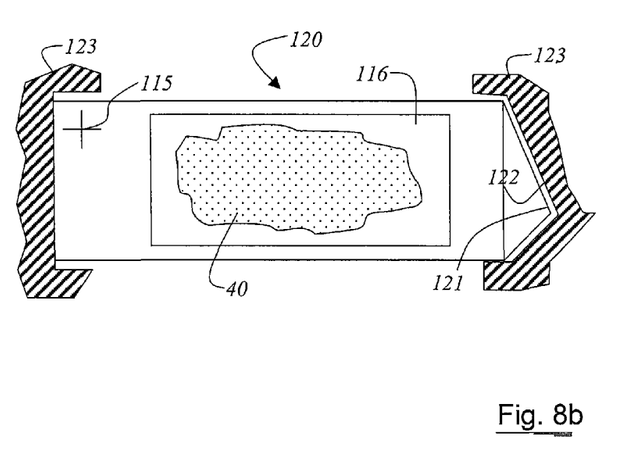
FIG. 8b another embodiment of the specimen slide that makes it easier to reproduce the specimen positions of the already acquired image.

FIG. 8b shows another embodiment of a specimen slide 120 that makes it easier to reproduce the specimen positions of the already acquired image. The specimen slide 120 is transparent in its entirety. However, it goes without saying that a combination of a transparent and a non-transparent part of the specimen slide 120 is possible. The specimen slide 120 has an element 121 that interacts with a corresponding counterpart 122 on the slide holder 123 on the microscope stage. The element 121 can be, for example, a nose, a bore, a projection, a cut-out or a combination of several elements. Consequently, the element 121 or the elements allow a reproducible positioning of the specimen slide 120 on the microscope stage. Moreover, the specimen slide likewise has a marking 115 that, interacting with the element 121, likewise allows a reproducible setting of the specimen stage corresponding to the X-value and the Y-value.

The invention was described with reference to specific embodiments. However, it goes without saying that changes and modifications can be made without departing from the protective scope of the claims below.

The invention claimed is:

1. A microscope system comprising:
   a microscope including an automatically adjustable subassembly having an adjustable element;
   a digital camera configured to acquire image data of an image of a specimen; and
   a computer system including:
      a display and a storage unit configured to store the acquired image data and to store, associated with the acquired image data, setting data defining a setting of at least one of an objective nosepiece, a microscope stage, a condenser, a filter changer, an adjustable diaphragm, a brightness controller and a lighting device of the automatically adjustable subassembly corresponding to the acquired image data, and
      a control unit configured to control functions of the microscope and to automatically adjust the adjustable subassembly so as to establish the setting defined by the setting data and corresponding to the acquired image data.

2. The microscope system as recited in claim 1 wherein the storage unit is configured to store image data of a reference image and to store, associated with the image data of the reference image, data defining a setting of the automatically adjustable subassembly corresponding to the image data of the reference image.

3. The microscope system as recited in claim 1 wherein the automatically adjustable subassembly further includes at least one of a magnification changer and a setting element of the digital camera.

4. The microscope system as recited in claim 1 wherein the objective nosepiece is configured to receive a plurality of objectives each in a respective position and to rotate between the positions, and further comprising a motor associated with the objective nosepiece and configured to rotate the objective nosepiece between the positions.

5. The microscope system as recited in claim 1 further comprising a first, a second and a third motor associated with the microscope stage, the first motor being configured to move the microscope stage in an X-direction, the second motor being configured to move the microscope stage in Y-direction and the third motor being configured to move the microscope stage in a Z-direction.

6. The microscope system as recited in claim 1 further comprising a motor-driven actuation element configured to change over the condenser.

7. The microscope system as recited in claim 3 further comprising a motor-driven actuation element configured to change over the magnification changer.

8. The microscope system as recited in claim 1 wherein the filter changer includes a filter wheel including a motor configured to move individual filter elements into an optical axis.

9. The microscope system as recited in claim 1 further comprising a motor configured to adjust the adjustable diaphragm.

10. The microscope system as recited in claim 1 wherein the brightness controller includes an electronic circuit.

11. The microscope system as recited in claim 3 wherein the display is configured to depict user interface of the digital camera configured to specify a setting of the digital camera.

12. The microscope system as recited in claim 11 wherein the user interface of the digital camera includes a first area, a second area and a third area, settings for acquisition of the image can being specifiable in the first area, a configuration for a type of the digital camera being settable in the second area, the image acquired by the digital camera being depictable in the third area.

13. The microscope system as recited in claim 1 wherein the display is configured to depict a user interface for handling the image data stored in the storage unit and for handling settings of the microscope corresponding to the image data.

14. The microscope system as recited in claim 13 wherein the user interface includes a plurality of windows.

15. The microscope system as recited in claim 14 wherein the plurality of windows includes a first window configured to enter and display a type of the microscope.

16. The microscope system as recited in claim 14 wherein the plurality of windows includes a second window configured to enter and display a freely definable description.

17. The microscope system as recited in claim 14 wherein the plurality of windows includes a third window configured to enter and display a setting of the microscope.

18. The microscope system as recited in claim 17 wherein the third window is configured to display at least one of a name assigned to the stored image data, a file name, a magnification or the objective used to acquire the image, a use of a magnification changer, a size of the diaphragm opening, a brightness, a type of condenser, an illuminated field diaphragm, a filter cube employed, an objective designation, a tube magnification, an X-position of a stage of the microscope, a Y-position of the stage, a Z-position of the stage, a contrasting method employed, a phototube employed, an article number of the phototube employed, and a position of an objective nosepiece of the microscope.

19. The microscope system as recited in claim 14 wherein the plurality of windows includes a fourth window configured to display a list of names assigned to individual images made up of acquired image data.

20. The microscope system as recited in claim 14 wherein the plurality of windows includes a fifth window configured to display, in a matrix as thumbnails, respective images corresponding to image data stored in the storage unit.

21. The microscope system as recited in claim 20 wherein the fifth window is configured to display on each of the thumbnails, respective data useable to at least one of set the microscope and designate the respective image data depicted on the respective thumbnail.

22. The microscope system as recited in claim 1 wherein the computer system is associated with an input unit including at least one of a mouse, a trackball, a keyboard, a touch-screen.

23. The microscope system as recited in claim 1 wherein the display is configured to depict a user interface useable to output a message indicating a status of the setting of the subassembly and based on the data defining the setting.

24. The microscope system as recited in claim 23 wherein the user interface is configured to depict subassemblies that go with a type of the microscope and that are to be adjusted, and wherein a first subassembly of the subassemblies that is automatically adjusted on the basis of the data defining the setting is associated with a second message indicating a change that has been made.

25. The microscope system as recited in claim 23 wherein the user interface is configured to depict subassemblies that go with a type of the microscope and that are to be adjusted, and wherein a first subassembly of the subassemblies that cannot be automatically adjusted on the basis of the data defining the setting is associated with a second message indicating that a change has not been made for the first subassembly.

26. The microscope system as recited in claim 25 wherein the first subassembly is configured to be adjusted manually by a user.

27. The microscope system as recited in claim 23 wherein the user interface is configured to depict subassemblies that go with a type of the microscope and that are to be adjusted, and wherein a first subassembly of the subassemblies that is not implemented in the microscope is indicatable on the display by a second message.

28. The microscope system as recited in claim 1 wherein the microscope includes specimen slide receivable by the microscope stage, the specimen slide including a marking detectable by the microscope system and configured to serve as a reference point for an X-value and a Y-value of the stage.

29. The microscope system as recited in claim 28 wherein the marking is disposed on a non-transparent part of the specimen slide.

30. The microscope system as recited in claim 1 wherein the microscope stage includes a slide holder, and wherein the specimen slide includes an interacting element configured to interact with a counterpart on the slide holder.

31. A method for operating a microscope system including a microscope having at least one automatically adjustable subassembly with at least one adjustable element, a digital camera connected to the microscope, and a computer system having at least one display and at least one storage unit, the method comprising:
    acquiring, by the digital camera, image data of an image of a specimen;
    storing the acquired image data in the storage unit;
    associating, with the acquired image data stored in the storage unit, setting data defining a setting of at least one of an objective nosepiece, a microscope stage, a condenser, a filter changer, an adjustable diaphragm, a brightness controller and a lighting device of the at least one subassembly of the microscope corresponding to the acquired image data;
    storing the setting data in the storage unit;
    depicting the acquired image on a user interface of the display;
    selecting the acquired image depicted on the user interface and the associated data defining the setting of the at least one automatically adjustable subassembly of the microscope; and
    automatically adjusting the at least one automatically adjustable subassembly using the at least one adjustable element so as to establish the setting defined by the setting data and corresponding to the acquired image data.

32. The method as recited in claim 31 further comprising:
    storing, in the storage unit, image data of at least one reference image; and
    associating, with the at least one reference image, data useable for a setting of the at least one automatically adjustable subassembly corresponding to the image data of the at least one reference image.

33. The method as recited in claim 31 wherein the at least one automatically adjustable subassembly further includes at least one of a magnification changer and a setting of the digital camera.

34. The method as recited in claim 31 wherein the display is configured to depict a user interface of the digital camera, the user interface including a first area, a second area and a third area, settings for acquisition of the image being specifiable in the first area, a configuration for a type of the digital camera being settable in the second area, the image acquired by the digital camera being depictable in the third area.

* * * * *